United States Patent
Ortega Rodriguez et al.

(10) Patent No.: US 7,075,950 B2
(45) Date of Patent: Jul. 11, 2006

(54) PROGRAM CLOCK REFERENCE CORRECTION METHOD IN A MULTIPLEXED BURST MODE DOWNLINK TRANSMISSION IN AN INTEGRATED MULTISPOT SATELLITE COMMUNICATION SYSTEM

(75) Inventors: Fernando Ortega Rodriguez, Madrid (ES); Maria Africa Rodriguez Martinez, Madrid (ES)

(73) Assignee: Alcatel, Paris (FR)

( * ) Notice: Subject to any disclaimer, the term of this patent is extended or adjusted under 35 U.S.C. 154(b) by 914 days.

(21) Appl. No.: 10/022,891

(22) Filed: Dec. 20, 2001

(65) Prior Publication Data
US 2002/0114290 A1    Aug. 22, 2002

(30) Foreign Application Priority Data
Dec. 21, 2000  (ES) ................................. 00500265

(51) Int. Cl.
*H04J 3/06* (2006.01)
(52) U.S. Cl. ................. 370/516; 370/503; 375/240.28; 348/512; 725/70
(58) Field of Classification Search ........ 370/316–324, 370/503–522
See application file for complete search history.

(56) References Cited

U.S. PATENT DOCUMENTS

| | | | |
|---|---|---|---|
| 5,790,543 A * | 8/1998 | Cloutier ....................... 370/252 |
| 6,195,392 B1 * | 2/2001 | O'Grady ................ 375/240.28 |
| 6,313,879 B1 * | 11/2001 | Kubo et al. ................. 348/512 |
| 6,351,471 B1 * | 2/2002 | Robinett et al. ............ 370/468 |
| 6,356,567 B1 * | 3/2002 | Anderson et al. ........... 370/516 |
| 6,429,902 B1 * | 8/2002 | Har-Chen et al. .......... 348/518 |
| 6,456,782 B1 * | 9/2002 | Kubota et al. ................ 386/98 |
| 6,546,013 B1 * | 4/2003 | Huang et al. ............ 370/395.1 |
| 6,724,825 B1 * | 4/2004 | Nemiroff et al. ...... 375/240.27 |
| 6,993,009 B1 * | 1/2006 | Kelly et al. ................. 370/350 |

* cited by examiner

*Primary Examiner*—Seema S. Rao
*Assistant Examiner*—Michael J. Moore
(74) *Attorney, Agent, or Firm*—Sughrue Mion, PLLC

(57) ABSTRACT

Program Clock Reference correction method in a multiplexed burst mode downlink transmission in an integrated multispot satellite communication system (S) in a multimedia broadcasting network for setting up bi-directional communication with a satellite with return channel. The correction is made as a direct function of the distance (d) between the real position of a packet (a12) in the downlink frame and the estimated position that the packet would occupy had it not been compressed in a modulation and compression stage.

5 Claims, 6 Drawing Sheets

PROGRAM CLOCK REFERENCE CORRECTION METHOD IN A MULTIPLEXED BURST MODE DOWNLINK TRANSMISSION IN AN INTEGRATED MULTISPOT SATELLITE COMMUNICATION SYSTEM

The present invention relates to a program clock reference correction method in a multiplexed burst mode downlink transmission in an integrated multispot satellite communication system in a multimedia broadcasting network, mainly in digital video broadcasting (DVB) applications that permits a user to request broadband interactive services employing standard stations both on the sending and on the receiving side. The invention proposes a correction method applicable to the transport streams transmitted by means of MPEG2-TS (Motion Picture Expert Group 2-Transport Stream) packets in burst form, by calculating the difference existing between a real position of a determined MPEG2-TS packet in the downlink direction and a theoretical position that said packet ought to occupy.

BACKGROUND OF THE INVENTION

The EN 300 421 standard of the ETSI (European Telecommunications Standards Institute) relates to DVB services over transparent satellite communication systems. The purpose of this standard is to furnish direct-to-user services known as DVB-S (digital video broadcasting via satellite), through an integrated receiver/decoder device that is located in the user's home. Its versatility in multiplexing permits the use of a transmission capacity encompassing a variety of television (TV) service configurations, including sound and data services. All the components of said services are time division multiplexed (TDM) on a single carrier. The most detailed description of this standard can be found in the ETSI publication, EN 300 421 V1.1.2 (1997–98) entitled: "Digital Video Broadcasting (DVB); Framing structure, channel coding and modulation for 11/12 GHz satellite services" whose content is included in this description by reference.

Moreover, the ETSI standard known as DVB-RCS001 makes reference to interaction channels on a transparent satellite distribution system. The purpose of this standard is to furnish basic specifications for the provision of interaction channels for interactive networks based on geo-stationary (GEO) satellites that incorporate fixed return channel satellite terminals (RCST). The service is also known as DVB-RCS (digital video broadcasting—return channel satellite). This standard facilitates the use of RCSTs for domestic installations both individual and collective types. It likewise supports the connection of said terminals with data networks at home, and is applicable to all the frequency bands allocated to GEO satellite services. The most detailed description of this standard can be found in the ETSI publication, TM2267r3DVB-RCS001rev12 (11 Feb. 2000) entitled: "Digital Video Broadcasting (DVB); Interaction Channel for Satellite Distribution Systems", whose content is included in this description by reference.

These two standards are of the mono-spot type; that is, the satellite defines a single zone as coverage zone. The mono-spot systems therefore present the drawback that, by having limited coverage zones, they are not suitable for more extensive areas on a worldwide scale. The services related with each of said standards are presently employed in a mutually independent form.

The steadily growing user demand for interactive services makes it necessary for satellite communication systems to support broadcasting with return channel to the end users when the latter may be scattered over entirely different and dislike regions of the world, and thereby facilitate better access and faster interconnection between them. This in turn make it necessary the provision of systems capable of broadcasting on networks that support multimedia having a multispot communication characteristic.

The service that DVB-S provides, although offering the possibility of direct communication to the user's home, has the drawback of not having foreseen the possibility of including a return channel in order that the user may communicate with the multimedia service provider. Also, the services furnished by DVB-RCS include said return channel, but do not provide the possibility of direct communication with the user's home for broadcast applications.

In the light of the foregoing, it has become necessary to facilitate an integrated multispot satellite communication system on a multimedia broadcasting network capable of supporting digital video broadcasting (DVB) applications in order to facilitate multimedia services directly to the user's home and permitting at the same time that said user can establish communication with the multimedia service provider over a return channel.

One solution to this problem, proposed by this same applicant, has been to offer the users a multimedia broadcast service such that the user may communicate with the multimedia service provider via a return channel to the satellite, all of this in a substantially economical manner.

Said solution proposed the combined use of the standardised DVB-S and DVB-RCS services, thereby obtaining a single, regenerative and multispot satellite system permitting the use of standard stations both on the sending and on the receiving side. Through said solution, both the end user and the multimedia service provider employ a return channel in accordance with the DVB-RCS standard via an uplink channel to the satellite.

On board the satellite the regenerative payload performs the multiplexing of the information coming from various sources into a data stream suitable for being received by a user who has available any standard integrated receiver/decoder equipment.

Moreover, according to the ETSI standard DVB-RCS001 (draft EN 301 790 V1.1.1.) relative to the interaction channels in satellite systems, the synchronisation of the bursts transmitted by the return channel satellite terminal (RCST) is carried out by receiving information on a network clock reference (NCR) inside the standard packets termed MPEG2-TS (Motion Picture Expert Group 2-Transport Stream), sent by a network control centre in DVB-S format. The RCST reconstructs the original 27 MHz reference of the network control centre, permitting it to transmit the return information in burst mode in an allocated time slot.

As has already been mentioned, the mutually independent and transparent use of the two broadcasting and interaction services performed in a conventional manner makes it unnecessary to have synchronization of the bursts in transmission of the programs offered to the users with the user-to-provider return service, thus the RCST could strictly employ the DVB-RCS standard.

However, on combining the two services, DVB-S and DVB-RCS, that is, when using an integrated broadcasting and interaction system as has been mentioned above, it is assumed that the RCSTs used by the broadcast provider shall be the same as those used by the users. It has therefore been chosen to carry out a burst synchronization that is common both for the interactive services and for broadcasting, and consequently permits the use of the same type of RCST on the service provider side and on the user side.

In the present state of the art, the rules for encoding moving pictures together with the associated audio signal within MPEG2-TS packets, as well as the synchronisation of the encoding system, are defined in the ISO/IEC 13818-1 standard. Said rules are based on receiving Program Clock Reference (PCR) fields. The PCR is the time reference in the transport stream from which the timing for decoding is obtained. The decoders reconstruct the program clock starting with these values and their respective arrival times.

According to the timing model in the recommendations of ISO/IEC 13818-1, it is assumed that all digitised pictures, as well as the audio samples that are applied to the encoder, appear once at the output of the decoder, after a fixed, end-to-end delay. Thus, the sample rates, both of video frames and of audio samples, in the decoder are exactly the same as in the encoder.

In the event of a re-multiplexing operation between the encoding and decoding functions, correction of the PCRs becomes necessary.

Said correction is conventionally achieved by the addition of a correction factor to the PCR according to the following formula:

$$\Delta PCR = del_{curr} - del_{const}$$

where $del_{curr}$ is the current delay experienced by the PCR and $del_{const}$ is a constant value that is used for all the PCRs of the program in question.

This solution is only valid if the MPEG2 packets are transmitted in continuous mode, that is, the information inserted by the encoder is kept valid at the output from the modulation stage. However, in the event of the MPEG2 packets being transmitted in burst mode—as has been mentioned above—the solution of correction by the scheme explained above will not achieve the desired result since it does not take into account the compression effect produced in TDMA (time division multiple access) mode. This would be the case in the integrated satellite systems in interactive networks for performing multimedia broadcasting with return channel in which the RCSTs transmit MPEG2 transport streams using the MF-TDMA access mode defined in the DVB-RCS standard.

Consequently, it is necessary to employ a new method of correcting the Program Clock Reference (PCR) that is applicable to broadcasting systems that transmit MPEG2 transport streams according to the access mode defined in the DVB-RCS standard.

DESCRIPTION OF THE INVENTION

To overcome the problems outlined above the Program Clock Reference correction method of an integrated multispot satellite communication system in a multimedia broadcasting network, object of the present invention, has been proposed.

On board a satellite there is, conventionally, a DVB regenerative processor that carries out the synchronous multiplexing of different uplink channels into a downlink signal in DVB-S format. Said processor must know in each case the current configuration with regard to the number of carriers that should be multiplexed and the number of users that share a common carrier. Therefore, the solution of the invention proposes that the PCR correction be done on board by calculating the difference between the present position of each MPEG2-TS packet within the downlink frame and the theoretical position that it is considered the packet ought to occupy.

Consequently, an object of the invention is to provide a Program Clock Reference correction method in a transmission over a downlink in an integrated multispot satellite communication system in which said downlink is transmitted in burst mode and comprises a plurality of multiplexed, modulated and compressed packets, corresponding to at least one user, characterised in that said correction of the Clock Reference is calculated in terms of a distance defined between a real position of a packet and an estimated position of said packet, the estimated position being that which said packet would occupy if the downlink had not been compressed in a modulation and compression stage.

According to an aspect of the invention, said correction is defined through the following formula:

$$C_{PCR} = t_{dpack} \cdot d$$

where "$C_{PCR}$" is the correction factor; "d" is the distance between the real position and the estimated position of the packet; and "$t_{dpack}$" is the duration in time of a packet in the downlink frame.

According to another aspect of the invention, said distance is defined by means of the following formula:

$$d = n_d - \frac{n_{dt}}{n_{ut}} \cdot n_u$$

where:

$n_d$ is the number of the downlink position of the packet in process;

$n_{dt}$ is the total number of packets in the downlink frame;

$n_{ut}$ is the total number of packets per frame and user; and $n_u$ is the number of the uplink position of the packet in process, and where both $n_d$ and $n_u$ start counting from zero.

According to an additional aspect of the invention, said transmission is carried out in MPEG2 transport streams in TDMA format.

Another object of the invention is to provide an integrated multispot satellite communication system for carrying out the method of the invention.

These and other characteristics of the invention are described in greater detail hereunder with the assistance of the drawings attached hereto.

DESCRIPTION OF A PREFERRED EMBODIMENT

Figure 1:
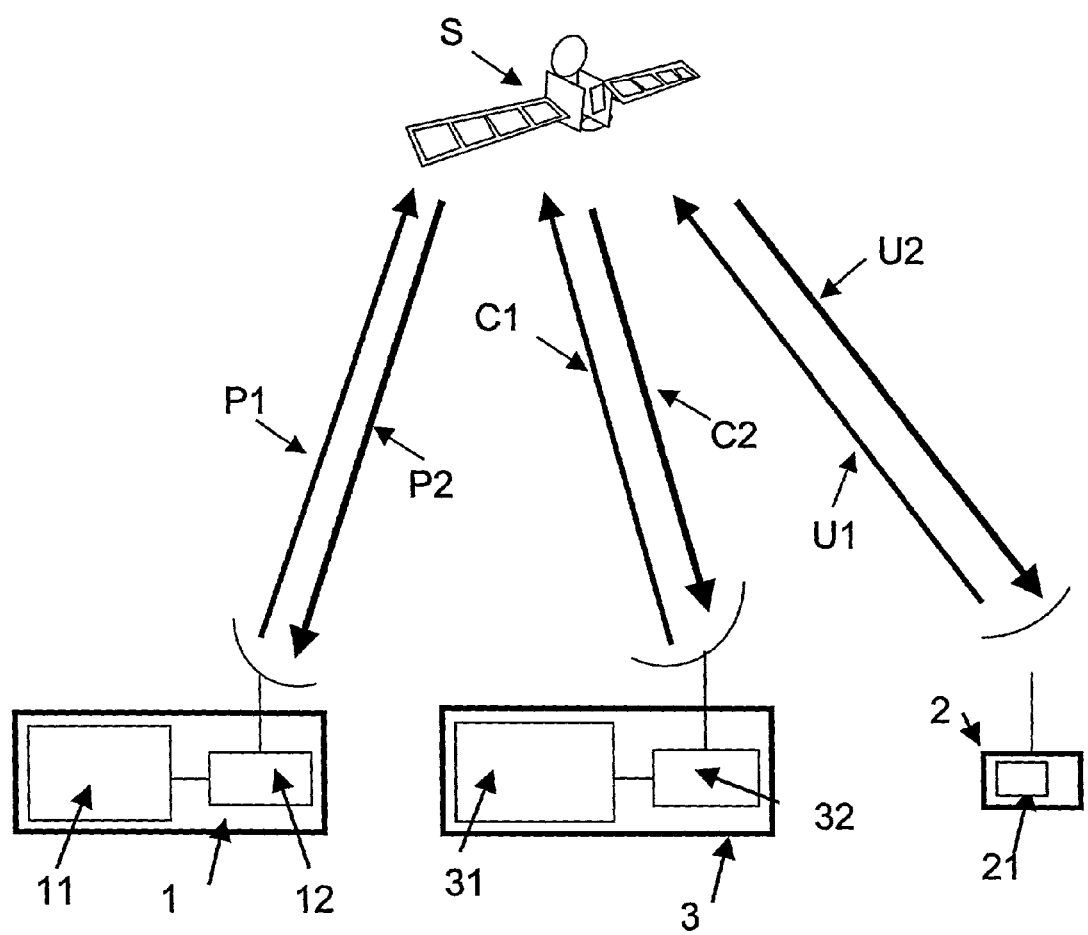
FIG. 1 is a schematic diagram of a multispot satellite communication system in a multimedia broadcasting network, in which the present invention is preferably applied.

To provide a better understanding of the scenario in which it is intended to implement the invention, a brief description is to be found hereunder of an example of an integrated system of broadcasting and interaction network making reference to FIG. 1.

According to a typical scenario of this system, a multimedia services provider 1 in a DVB system sends multimedia service signals, as for example video on demand, to a user 2 via a satellite S. The provider 1 comprises, among other components necessary for its operation, a broadcast signal producing means 11 and a return channel satellite terminal (RCST) 12. The provider sends the broadcast signal P1, which incorporates the multimedia channel, to the user 2 via the satellite S. This signal also contains information concerning the return signalling that serves for accessing and synchronising to the interactive network. The signal P1 is therefore an uplink signal of the type of signals that comply with the aforementioned DVB-RCS standard.

A network controller means 3 serves to control and administer the network functions. In addition it is capable of transmitting information directly to the satellite regarding signalling and timing for the network operation from a signal generator 31, employing the same DVB-RCS standard mode; at the same time it is capable of receiving the different return channels coming from the multimedia services provider and from the user, which the satellite S transmits to it by means of DVB-S signals. The signalling is to be understood as including all network control operations, as for example network access request, authentication, synchronisation, etc. The direct signalling is that sent from the controller means 3, and the return signalling corresponds to the signal sent by the user 2 and/or the provider 1. Consequently the signalling part of the P1 and U1 signals is addressed to the controller means 3.

The controller means also comprises therefore a return channel satellite terminal (RCST) 32.

The satellite S can be, preferentially, of the multispot type whereby it may have a multiple coverage zone, whereby various users 2 can request, individually, broadband multimedia services independently of where they are located, provided that they are within the coverage zone of the multispot satellite S. In FIG. 1 only one user 2 is shown for reasons of simplification, it being understood that there can exist various users in communication with the satellite S.

With this arrangement the user 2 requests, via a signal U1, a predetermined multimedia service from provider 1. Said signal is sent to the satellite S and contains the return channel to the provider 1 and the return signalling to the control centre 3, both in DVB-RCS format. The satellite S serves to transmit the request to the service provider 1 by means of a signal P2 of the DVB-S type that contains the return channel of the user 2 and the signalling of the controller means 3. Said signal P2 is received by the return channel satellite terminal 12 and is then processed in a conventional manner in order to attend the request of the user 2.

The control operations for sending the signals U1 and P2, as well as the verification of user identity and profile, are carried out in the controller means 3 through the interchange of signals C2 in DVB-S format and C1 in DVB-RCS format. The signal C1 serves for sending signalling to the provider 1 and/or to the user 2, and the signal C2 serves for receiving the return signalling from the provider 1 and/or from the user 2. These signals shall have to pass through the return channel satellite terminal 32 in a bi-directional manner. Assuming that the user is identified and his profile is approved for receiving the service requested, the provider 1 sends the broadcast signal P1 to the satellite. This signal is sent in DVB-RCS format. Once received in the satellite, this signal together with other possible uplink signals received from the same or other broadcast sources are multiplexed in a multiplexer to obtain a signal in DVB-S format in the form of a data stream suitable for being received by any integrated receiver/decoder equipment. The multiplexing is performed by means of a regenerator means on board the satellite. Said regenerator, as well as carrying out the multiplexing, is capable of performing functions of cross-connecting and/or broadcasting channels to different coverage zones.

The user 2 receives the multimedia channel from the provider 1 and the signalling from the controller means 3, both in DVB-S format. The user 2 has incorporated in his home a return channel satellite terminal (RCST); thus he has the facility for communicating over a return channel with said satellite S and via the signal U1 mentioned which, by being in DVB-RCS format, permits this operation. In this way, all the signals received in the satellite S from the users are multiplexed in the same multiplexer. Once multiplexed, the satellite S sends the output signal to the provider 1 via the signal P2 that is in DVB-S format.

The operation of the RCST comprises the transmission in multi-frequency mode in time division multiple access, that is MF-TDMA, of bursts that contain MPEG2-TS packets following an uplink frame structure just as described in the DVB-RCS standard.

Figure 2:
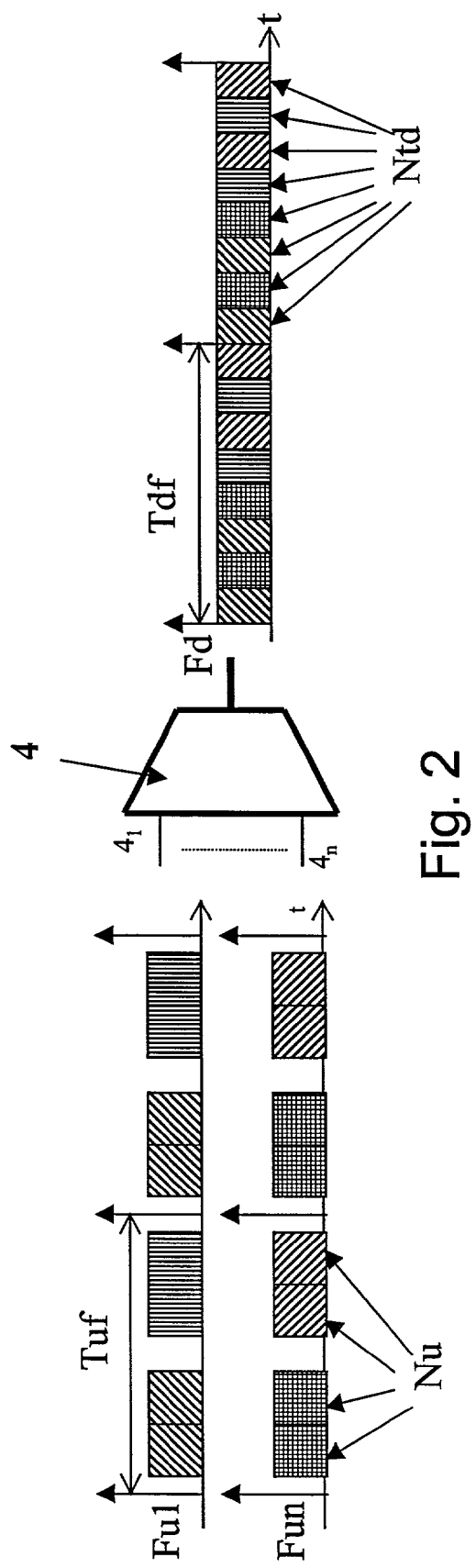
FIG. 2 represents a schematic of synchronous multiplexing with various frequencies in the uplink direction and one frequency in the downlink direction.

In FIG. 2, the carrier frequencies $Fu_1$ and $Fu_n$ can be seen and an uplink transmission frame period Tuf is shown which at each frequency contains a determined number of information packets Nu, which in the case of the example of this figure is four. These packets, after processing in demultiplexing, demodulation, decoding and descrambling stages, not shown in the figure for simplification, are applied to a multiplexer means 4, with n inputs $4_1$ to $4_n$ and an output frequency Fd for the downlink signal. Given that the downlink frame period Tdf is the same as that of the uplink frame, said multiplexer 4 employs a synchronous scheme for fitting the uplink packets into a downlink signal by using a downlink transmission rate that is a multiple of the network reference clock frequency. The result is a number of downlink packets Ntd (in the case of the figure it is 8 since n=2 was taken) fitted into the downlink frame.

The PCR in an MPEG2 transport stream provides the Clock Reference for a program, where the program is a set of elementary streams with a common time base, said streams being intended for synchronous encoding and presentation. A transport stream can likewise contain multiple programs with independent time bases.

The PCR is a 42-bit field encoded in two parts. The first part, termed PCR-base (base of the Program Clock Reference) is a field of 33 bits in units with a period of ⅟300 of the RCST system clock frequency (27 MHz+810 Hz). The second part, termed PCR-ext (extension of Program Clock Reference) is a field of 9 bits in units of its respective system clock frequency.

The encoded value in the PCR fields indicates the time estimated for the arrival of the byte that contains the last bit of the PCR-base, which is obtained through the following equation:

PCT (time)=PCR-base×300+PCR-ext.

The PCR fields are introduced into the adaptation field of some transport stream packets, the maximum interval of time between successive PCRs being 100 ms. The PCR tolerance, defined as the maximum acceptable inaccuracy in the received PCR, is ±500 ns.

Figure 3:
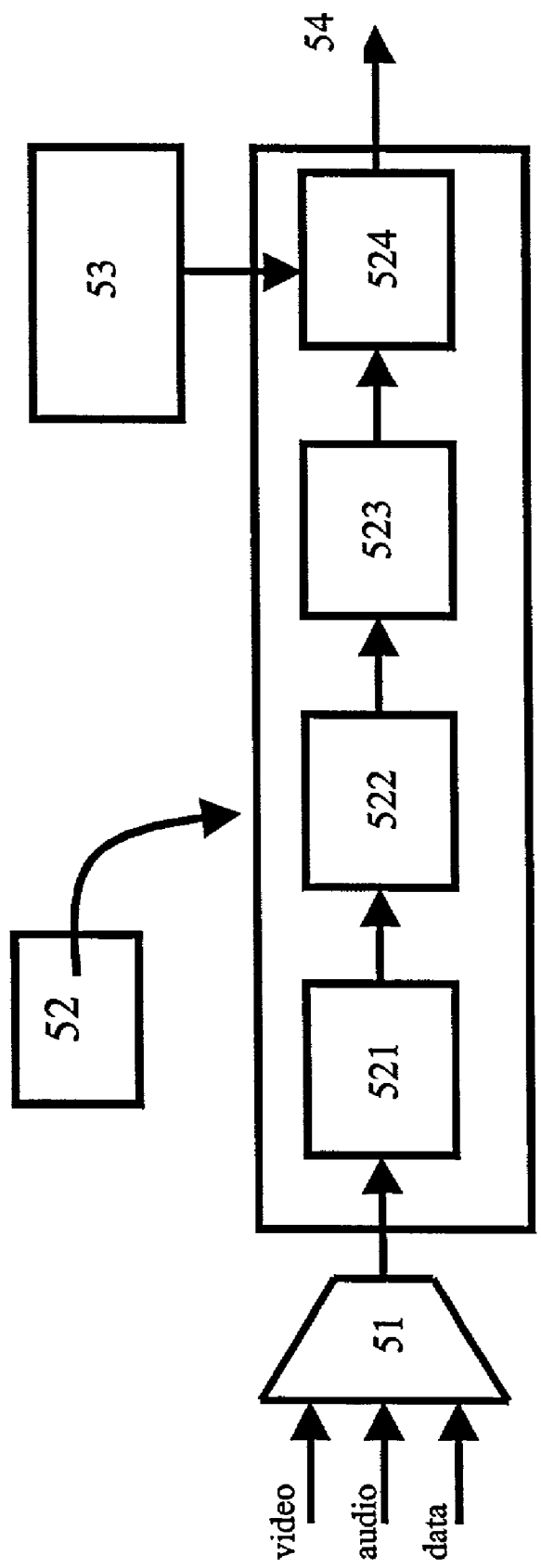
FIG. 3 shows a block diagram illustrating the stages of MPEG encoding and MF-TDMA modulation by which the packets are compressed for their transmission in the uplink direction.

With reference now to FIG. 3, a block diagram can be seen in which is shown a first stage 51 for multiplexing video, audio and data signals in MPEG format that are compressed and encoded "on-land". The PCRs are calculated and inserted in the MPEG packets in this stage. Subsequently, the encoded signal is introduced into an RCST MF-TDMA modulation stage 52. In said modulation stage, the encoded signal passes through a burst formatting unit 521, an energy spreading unit 522, a channel encoding unit 523 and, finally, an I/Q (In-phase/Quadrature) burst modulation unit 524 which, in turn, receives synchronisation 53 for transmitting in the uplink direction. People expert in the technique is familiar with the operation of these units.

The outcome is a signal 54 modulated and encoded by said MF-TDMA modulation stage for transmission in a time slot allocated to said signal within an uplink frame.

Figure 4:
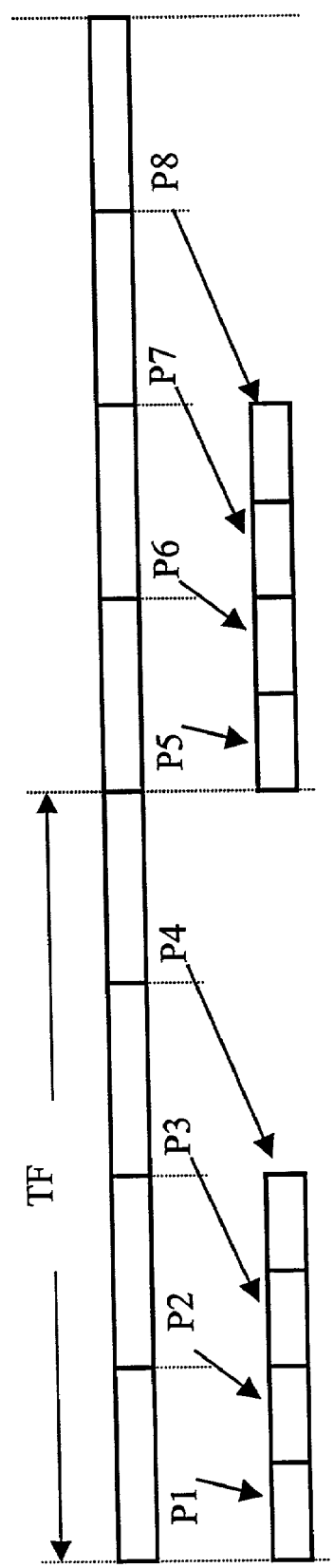
FIG. 4 represents a schematic of timing frames that hold MPEG packets and their compression by the modulator of FIG. 3.

In the upper part of the FIG. 4 can be seen two time frames TF in the MPEG2 encoding stage with the PCR fields inserted (not shown in the figure) in which by way of example each time frame TF is divided into four MPEG2 packets: P1, P2, P3 and P4 in a first frame and P5, P6, P7 and P8 in a second frame. Consequently, each MPEG2 packet (P1 to P8) has a duration of ¼ TF. Once the MF-TDMA modulation and the pertinent compression have been carried out in the following stage, the uplink frame acquires the form shown in the lower part of FIG. 4, where the transformation of the packets P1; . . . ; P8 into packets with a shorter duration can be appreciated. This transformation gives rise to the position of the packets, and consequently the difference in time between them, being different to the position that theoretically said packets ought to occupy in the event that said compression of the downlink signal had not taken place.

On board the satellite, the DVB processor re-multiplexes the incoming packets into a downlink DVB-S stream in a synchronous way just as has been mentioned above.

Thus, the method of correcting the PCR according to the present invention is carried out in the following manner:

The distance between a real position of a packet in a compressed signal in the downlink frame and the position that the same packet ought to occupy if said compression had not taken place is calculated.

The correction in time of the PCR is calculated by multiplying said distance factor by the duration of a packet in the downlink frame.

The foregoing is expressed by means of the following formula:

$$C_{PCR} = t_{dpack} * d$$

where:

"$C_{PCR}$" is the desired correction factor;

"d" is the distance between the real position and the theoretical one that it is estimated the packet should occupy; and "$t_{dpack}$" is the duration in time of a packet in the downlink frame, which is defined in the following manner:

$$t_{dpack} = \frac{Tframe}{n_{dt}} \quad (1)$$

In this formula, $T_{frame}$ is the duration of the downlink frame and $n_{dt}$ is the total number of MPEG2 packets transmitted in one downlink frame.

The distance "d" is calculated according to the following formula:

$$d = n_d - \frac{n_{dt}}{n_{ut}} \cdot n_u \quad (2)$$

where:

$n_d$ is the number of the downlink position of the packet in process;

$n_{dt}$ is the total number of packets in the downlink frame;

$n_{ut}$ is the total number of packets per frame and user; and $n_u$ is the number of the uplink position of the packet in process, and where both $n_d$ and $n_u$ start to count from zero.

The PCR correction method proposed herein is described in greater detail below, by means of a practical example and making reference to FIGS. 5 and 6.

Figure 5:
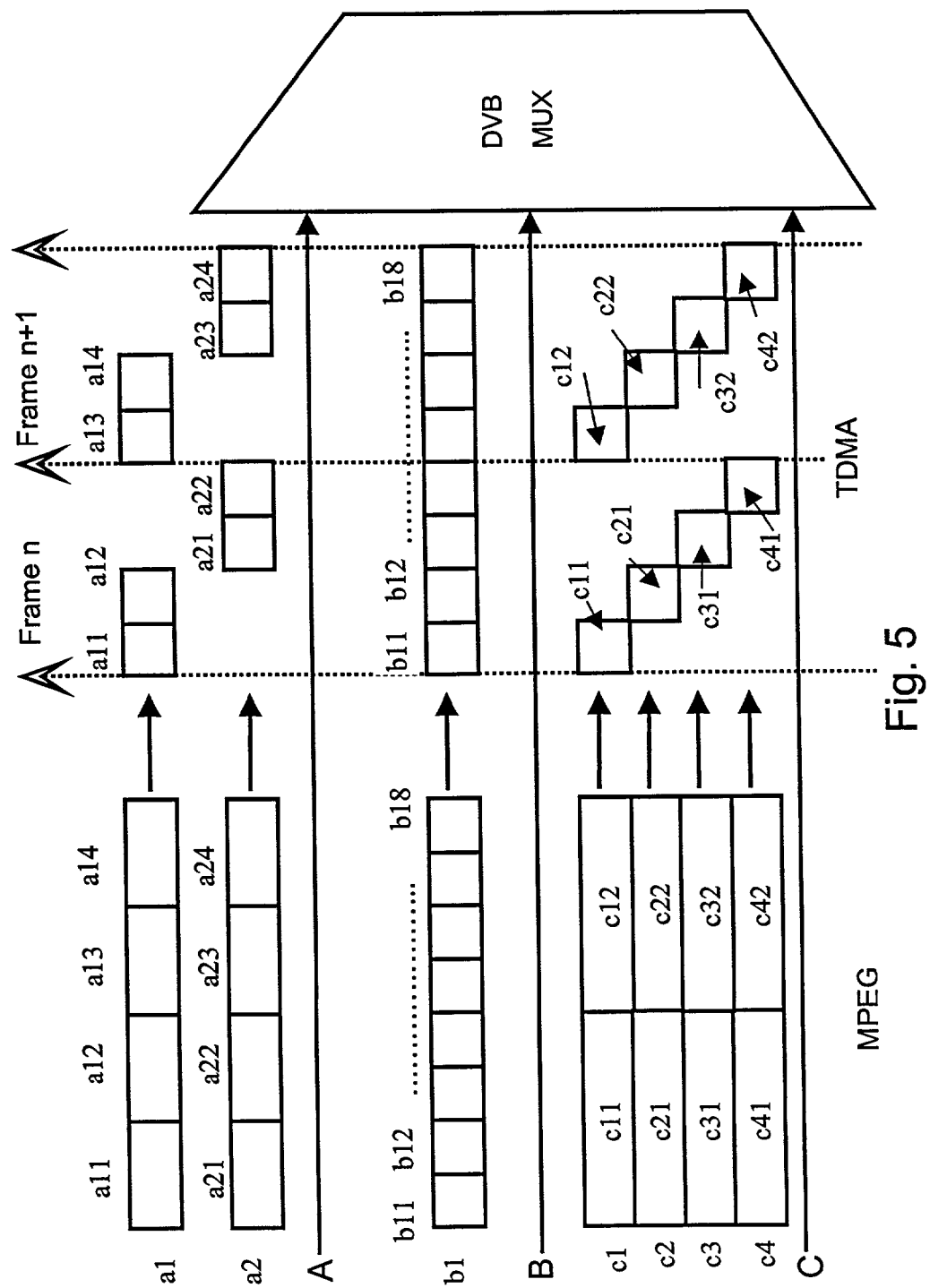
FIG. 5 shows an example of a scenario with various carriers with different users transmitting on different channels in the stages of MPEG encoding and TDMA modulation.

In FIG. 5 can be seen an example of a scenario in which can be observed a first carrier A having two users a1 and a2: a second carrier B having one user b1; and a third carrier C having four users c1, c2, c3 and c4.

User a1 employs four uplink packets a11, a12, a13 and a14. User a2 likewise employs four uplink packets a21, a22, a23 and a24. User b1 employs eight uplink packets b11, b12, b13, b14, b15, b16, b17 and b18. The users c1, c2, c3 and c4 each employ two packets: c11, c12; c21, c22; c31, c32; and c41, c42, respectively. These packets pass through the MPEG encoding stage just as is described above and can be appreciated on the left-hand part FIG. 5.

When performing the MF-TDMA modulation and compression, the description of which is provided above, two frames are produced, Frame n and Frame n+1, in which are lodged the modulated and compressed packets to be subsequently applied to the DVB multiplexer in order to produce the downlink signal.

Figure 6:
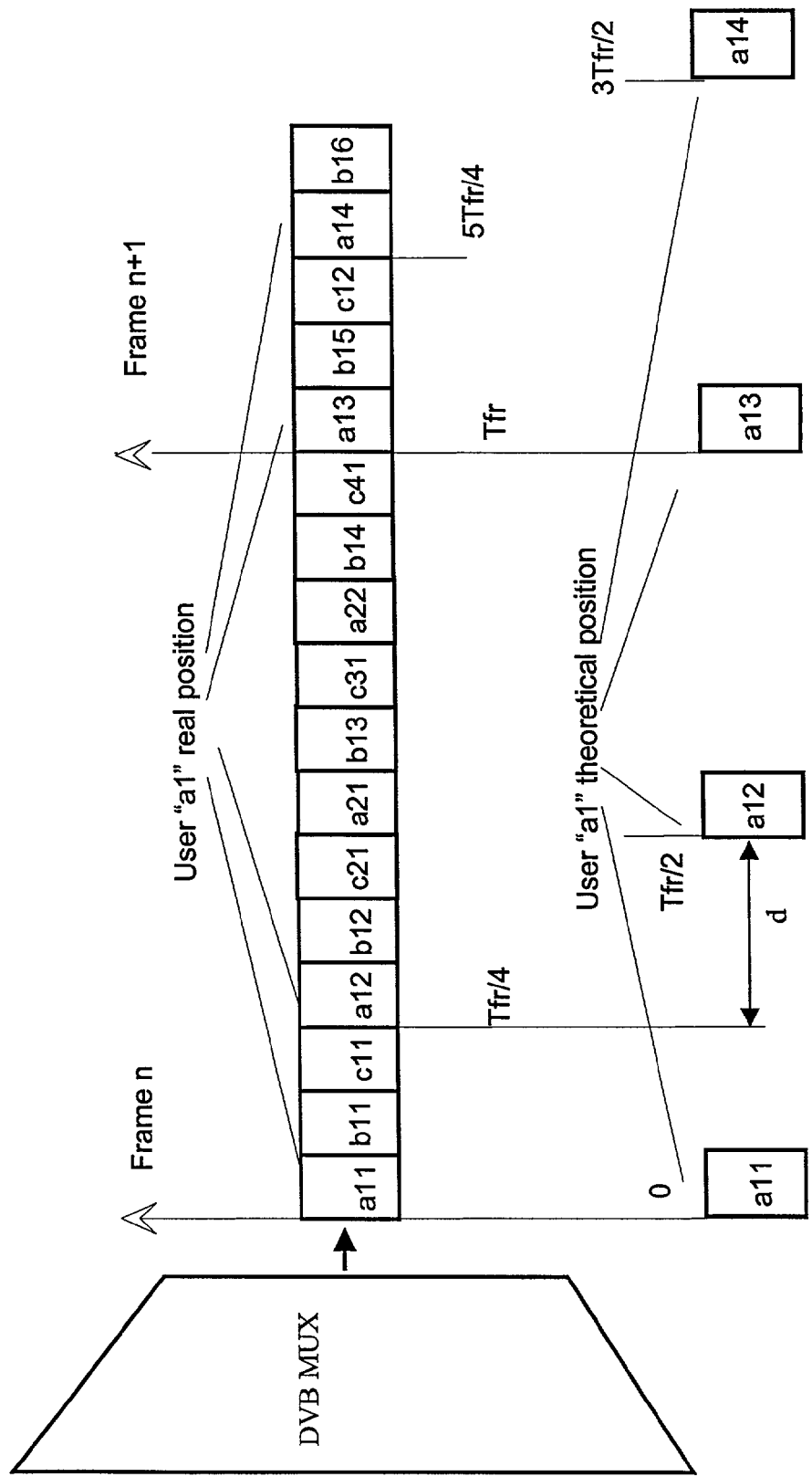
FIG. 6 shows the multiplexed DVB signal, according to the scenario described in FIG. 5, for its transmission in the downlink direction with some of the users' packets in their respective real and theoretical positions.

In FIG. 6 can be seen the configuration of the downlink signal produced by the DVB multiplexer. The frame represented through the reference Frame n shows a burst of packets from a11 to c41. This frame shows the real positions of the downlink packets that obey the modulation criterion established by the multiplexer DVB MUX of FIGS. 5 and 6. As can be appreciated, the real position of the packets in the downlink frame has been altered with regard to its initial position.

This fact is illustrated in relation with user a1, whose respective packets a11, a12, a13 and a14 would have theoretical positions as shown in the lower part of FIG. 6.

Consequently it can be seen in said figure that, for example, the real position of the packet a12 is situated at ¼ of the total duration of frame Frame n, that is, at point Tfr/4 in the figure, whilst its theoretical or estimated position would be situated at ½ of the duration of the same frame, that is at point Tfr/2. Said distance "d" is pointed out in FIG. 6 by means of a double arrow.

By applying formula (2) to the example of FIG. 6, the value of the distance "d" in relation with the packet a12 can be calculated.

In this case (see FIGS. 5 and 6):

$n_d=3$
$n_{dt}=12$
$n_{ut}=2$ and
$n_u=1$

Thus:

$$d=3-(12/2)*1$$

therefore:

$$d=-3$$

Thanks to the solution proposed by the invention, the following significant advantages are obtained:

The method of the invention permits the use of MPEG2 encoders that comply with the pertinent standard for generating the Program Clock Reference.

It likewise permits the use of TDMA modulators that comply with the DVB-RCS standard for the transmission of MPEG2 transport streams in burst mode.

The PCR correction is centralised in the DVB processor on board the satellite, whereby a change in the order of multiplexing the packets would not signify a change in the configuration of the RCSTs.

The invention claimed is:

1. A Program Clock Reference (PCR) correction method in a transmission over a downlink in an integrated multispot satellite communication system (S) in which said downlink is transmitted in burst mode and comprises a plurality of multiplexed, modulated and compressed packets, corresponding to at least one user (a1, a2, b1, c1, c2, c3 and c4), wherein said method of correcting a Program Clock Reference comprises calculating a distance (d) between a real position of a packet (a12) and an estimated position of said packet, the estimated position being that which said packet (a12) would occupy if the downlink had not been compressed in a modulation and compression stage.

2. The method of claim 1, wherein said PCR correction is defined by the following formula:

$$C_{PCR}=t_{dpack} \cdot d$$

where:

"$C_{PCR}$" is the correction factor;
"d" is the distance between the real position and the estimated position of the packet; and
"$t_{dpack}$" is the duration in time of a packet in the downlink frame.

3. Method according to claim 1 in which said distance (d) is defined by the following formula:

$$d = n_d - \frac{n_{dt}}{n_{ut}} \cdot n_u$$

where:

$n_d$ is the number of the downlink position of the packet in process;
$n_{dt}$ is the total number of packets in the downlink frame;
$n_{ut}$ is the total number of packets per frame and user; and
$n_u$ is the number of the uplink position of the packet in process, and where both $n_d$ and $n_u$ start counting from zero.

4. Method according to claim 1 in which said transmission is carried out in MPEG2 transport streams in TDMA format.

5. An integrated multispot satellite communication system (S) for carrying out the method of claim 1.

* * * * *